Sept. 5, 1967          D. L. FITTON          3,340,095
FUEL CELL CONSTRUCTION
Filed May 25, 1961
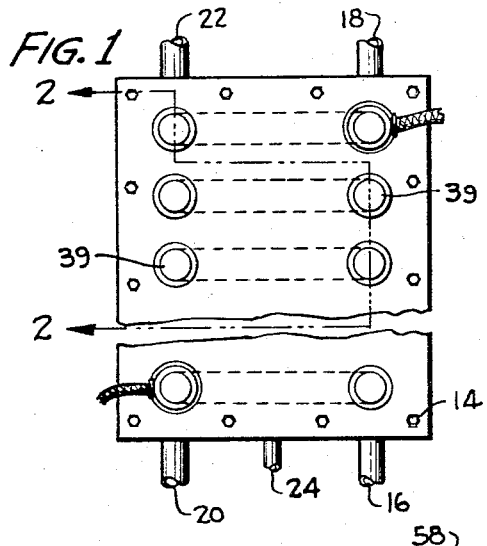
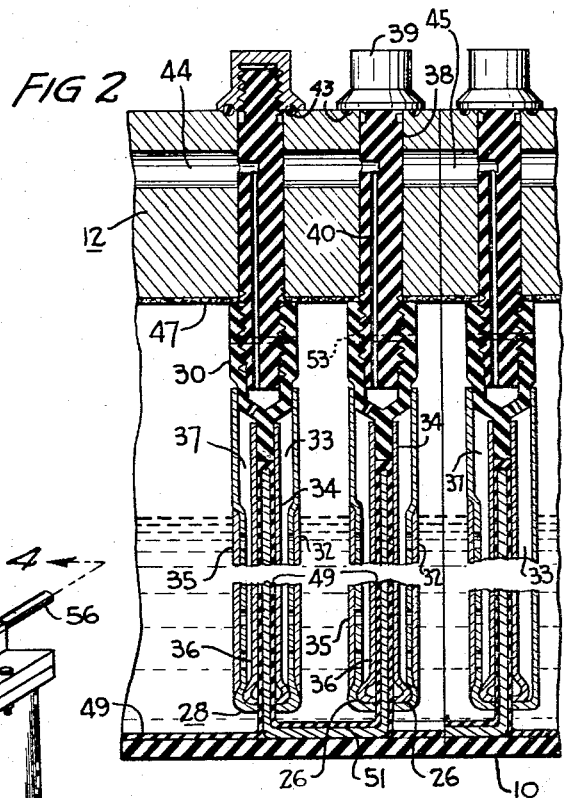
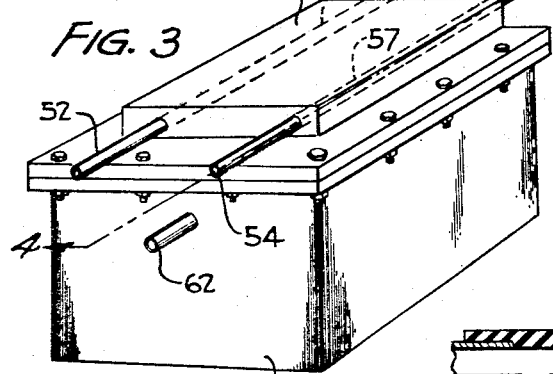
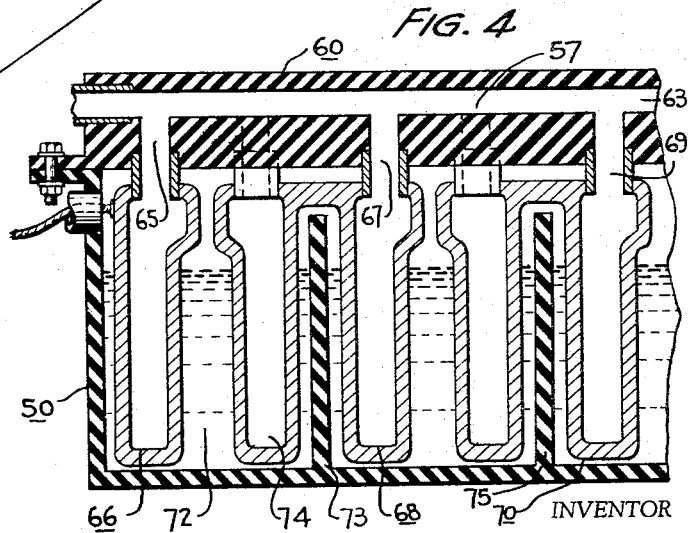
INVENTOR
David L. Fitton
BY *Watson, Cole, Grindle & Watson*
ATTORNEYS

3,340,095
FUEL CELL CONSTRUCTION
David L. Fitton, Hazardville, Conn., assignor, by mesne assignments, to Leesona Corporation, Cranston, R.I., a corporation of Massachusetts
Filed May 25, 1961, Ser. No. 112,696
3 Claims. (Cl. 136—86)

This invention relates to fuel cells, and more particularly, to an improved fuel cell construction.

Priorly, extensive work on fuel cells has been directed to the problems of gasketing to retain the respective gases and the electrolyte in their respective containers or compartments. This problem of gasketing is critical because of the high pressure and temperature and corrosive nature of the fluids. The gasketing can be substantially eliminated in accordance with this improved construction, and thus the problems incident thereto are obviated.

Accordingly, it is an object of this invention to provide an improved fuel cell construction.

It is another object of this invention to provide a fuel cell construction in which the problems of gasketing are eliminated.

It is still another object of this invention to provide an improved fuel cell construction in which no gaskets are employed within the respective unit cells.

It is still another object of this invention to provide an improved fuel cell construction utilizing novel apparatus for feeding gases to the respective cells.

Briefly, in accordance with aspects of this invention, an improved fuel cell module is provided in which the electrodes are suspended in the electrolyte by means which provide fluid passages to the fuel cell modules. In one illustrative embodiment of this invention, hollow posts are employed to suspend the electrodes in the electrolyte and the gases are fed to the electrodes through the posts. In accordance with still other aspects of this invention, the cover for the fuel cell is formed of insulating material and is provided with gas feed manifolds. Advantageously, these manifolds communicate with passages through the suspension devices for the electrode modules and thus complete the passageway for the gases between the modules and the external gas supply sources. These modules are suspended in a tank of electrolyte.

In accordance with one illustrative embodiment of this invention, the fuel cell cover is formed of ceramic material and is formed with main gas feed manifolds running parallel to the surface. Apertures are provided transversely through the cover adjacent the manifolds for the insertion of bolts which support the fuel cell modules. Advantageously, these bolts have passages which communicate with the main passages in the cover and thus provide complete fluid passages to the respective sides of the fuel cell module. For example, a first main manifold passing through the cover provides a passage for hydrogen gas which communicates with a passage through the electrode module supporting member to provide a passage to the hydrogen electrode. A second main gas feed manifold passes through the ceramic cover in a direction somewhat parallel to the first main manifold and communicates with a second passage through the module supporting member to complete a passage for the other gas, such as oxygen, to the opposite or positive electrode.

In accordance with another illustrative embodiment of this invention, an insulating cover made of any suitable insulating material, such as a ceramic material, is formed with main gas passages therethrough which may communicate with a supply conduit connected to the cover at one of the passages. The electrodes may be individually supported relative to the cover by means of pipes defining individual secondary passages therethrough which communicate with the respective main gas passages. For example, a first main gas manifold may pass longitudinally of the cover and communicate with a number of secondary passages defining pipes. Individual ones of the electrodes are formed as gas chambers supported by secondary passage pipes and thus permit the passage of the gas to the chamber defining electrode. Advantageously, each of the electrodes is mounted as a module and the electrode may define only one wall of the gas compartmented module. These electrodes define outer walls of the module which contact the electrolyte to permit the necessary interface between the gas and the electrolyte within the electrode.

These and various other objects and features of the invention will be more clearly understood from a reading of the detailed description of the invention in conjunction with the drawing, in which:

FIGURE 1 is a plan view of one illustrative embodiment of this invention;

FIGURE 2 is a view in elevation, partly in section, of the embodiment of FIGURE 1 to a larger scale;

FIGURE 3 is a perspective view of another illustrative embodiment of this invention; and FIGURE 4 is a view in section of the embodiment of FIGURE 3 taken along the line 4—4 of FIGURE 3.

Referring now to FIGURES 1 and 2, there is depicted a fuel cell in which a tank 10 is employed to retain the electrolyte. A cover 12 is provided on the tank 10 and is secured in place by a number of bolts 14. The cover 12 is provided with inlet and outlet connections 16 and 18, respectively, for one of the gases, and inlet and outlet connections 20 and 22, respectively, for the other of the gases. Advantageously, the tank 10 is provided with an electrolyte vapor vent 24. A number of fuel cell modules or bipolar mounts are supported in the tank 10 and these modules are best seen in FIGURE 2.

In FIGURE 2, there is depicted to a larger scale a cover 12 from which are suspended bi-polar electrode mounts or modules 26 and 28. These bi-polar mounts are independent of each other and the number of bi-polar mounts employed is optional, depending on the required electrical capacity. The bi-polar mount comprises a support member 30 on which are mounted electrodes 32 and 35 on the opposite surfaces thereof. The support 30 is of metal and acts as an electrical connector between the two electrodes of the module. Advantageously, gas pockets are provided between the respective electrodes which communicate with only one of the electrodes. For example, electrode 32 may be the positive electrode, and the gas chamber 33 for this electrode, defined by the separator member 34 and electrode 32, receives one of the gases such as oxygen. This gas is fed to the bi-polar mount, or module through the main gas manifold in the cover which will be subsequently described. Similarly, separator member 36 defines a chamber 37 with electrode 35, which chamber communicates with the other main gas manifold in the cover. The support 30 is secured such as by threads to a rod 38 which passes transversely through the cover and is secured in position by threaded cap 39. Each rod 38 has a secondary gas passage 40 therein. These gas passages are positioned to communicate with respective main gas manifolds in the cover 12. For example, passage 40 in one rod 38 communicates with main manifold 44 while passage 40 in the other rod 38 supporting the module communicates with main manifold 45. Main manifold passages 44 and 45 may be laterally displaced relative to each other and may run parallel to each other, as shown in FIGURE 2. In either event, however, suitable secondary passages through the module support member 30 communicate with the respective main manifolds 44 and 45 and provide communicating secondary passages to the respective electrode chambers.

The supporting rod such as 38 may be retained in place by a suitable nut such as 39, which nut may threadably engage or be otherwise secured to the end of the rod 38 or rod 38 may be a bolt threaded to the point of engagement with the electrodes. An O ring seal 43 is provided around each of rods 38. Gasket 47 provides a suitable seal between the bi-polar supports, such as 30, and the cover 12. The bottom of the tank 10 may have a lining 49 of suitable insulating material such as Teflon or green nickel oxides, or it may be coated with a ceramic material.

For the purpose of mechanical support, and for maintaining equal spacing between the bi-polar mounts, a U-shaped separator 51 is inserted in the respective adjacent bi-polar mounts such as 26 and 28 in the manner shown in FIGURE 2 to isolate the electrolyte between chambers. This insulating material 49 also covers each of separators 51. The tank is filled with the electrolyte to the level sufficient to cover the electrodes and a suitable vent 24 is provided in the tank 10 for the purpose of exhausting the vapor resulting from the chemical reaction.

This novel construction eliminates the cumbersome tubes and fittings for the purpose of feeding the gases to respective cells and also obviates the necessity for gasketing between respective electrodes. Advantageously, compartments may be provided in the tanks by suitable separators such as separator 51, insulated by lining 49 and connected to, or integral with, the tank walls to prevent an electrical shunt through either the electrolyte or the tank walls. The ceramic cover prevents any electrical connection between respective electrodes. Vapor vent 24 prevents the accumulation of pressurized vapor within tank 10 and communicates with vents 53 through bi-polar supports 30 to maintain equal pressure in each electrolyte compartment. Suitable electrical connections, not shown, may be made to the end electrodes, which are single electrodes suspended by bolts 30 in the same manner as the bi-polar mounts. Advantageously, bolt cap 39 may be covered with insulating material, not shown, to prevent an accidental short.

Referring now to FIGURES 3 and 4, there is depicted another illustrative embodiment of this invention. As shown in perspective in FIGURE 3, a tank 50 has a number of pipes 52, 54, 56 and 58 communicating therewith. These pipes communicate with suitable main gas manifolds 57 and 59 in the insulating cover 60. An electrolyte vapor vent 62 is provided which passes through one wall of the tank 50.

As best seen in FIGURE 4, the cover 60 is provided with suitable main gas passages or manifolds such as passage 57. This passage extends longitudinally of the cover and communicates with a number of secondary passages such as 65, 67 and 69 which extend perpendicularly through one wall of the cover 60. Advantageously, each of these passages communicates with a unitary electrode module. For example, secondary passage 65 communicates with a module 66, passage 67 communicates with a module 68, while passage 69 communicates with a module 70. Each of these modules defines a gas chamber in which the respective electrodes may define one wall of the chamber, or may define all the walls, as shown in FIGURE 4, and these electrodes are exposed to the electrolyte 72. At least two of these modules are mounted in one compartment such as is defined by the partitions as 73 and 75. In the one compartment with module 66, which defines an electrode of one polarity, is a second module 74 defining the opposite polarity electrode. The module 74 is connected to a main manifold 59 in the cover 60. The cover 60, which is advantageously formed of insulating material, such as a ceramic material, contains these main passages which are cast internally. The fuel manifolds cannot short-circuit the cells since they are defined of insulating material. No gaskets are needed in contact with the electrolyte. Suitable electrical connections may be defined by straps which are connected to the individual modules in a manner well known in the art.

While I have shown and described two embodiments of my invention, it is understood that the principles thereof may be extended to many and varied types of devices. The invention, therefore, is not to be limited to the details illustrated and described herein.

What is claimed is:
1. A fuel cell battery comprising a tank having electrolyte therein, a cover on said tank, a plurality of hollow rods made of insulating material associated with means for suspending said rods from said cover, an electrochemical unit associated with means for suspending said electrochemical unit from each of said rods so as to project said unit into said electrolyte, said unit comprising a mounting having electrodes of opposite polarity on opposite major surfaces thereof with one major surface of each electrode in contact with electrolyte, means defining gas chambers adjacent the major surface of each of said electrodes opposite of said major surface in contact with said electrolyte, and means for feeding gas to said gas chambers through said cover and said rods.

2. A fuel cell battery according to claim 1 wherein said fuel cell unit includes a substantially flat member positioned between said electrodes, said member and said electrodes defining said gas chambers, and said gas feeding means comprises means for feeding a first gas to one of said chambers and means for feeding a second gas to the other of said chambers.

3. A fuel cell battery comprising a tank, a cover on said tank having gas passages therethrough, electrolyte in said tank, a plurality of hollow rod means associated with means for connecting said rod means to said cover, an electrochemical unit associated with means for connecting said unit to each of said rod means so as to project said unit into said electrolyte, said unit comprising electrodes in contact with electrolyte and gas chambers in communication with said electrodes, means communicating with said gas passages in said cover for feeding gases to said chambers, each of said rod means connecting with one of said passages through said cover for feeding a gas to one of said chambers.

References Cited
UNITED STATES PATENTS

| | | | |
|---|---|---|---|
| 913,390 | 2/1909 | Jungner | 136—86 |
| 1,182,759 | 5/1916 | Emanuel | 136—86 |
| 2,901,523 | 8/1959 | Justi et al. | 136—86 |
| 3,099,587 | 7/1963 | Chambers | 136—86 |
| 3,106,494 | 10/1963 | Thorsheim | 136—86 |
| 3,110,631 | 11/1963 | Carlton | 136—86 |
| 3,113,048 | 12/1963 | Thompson | 136—86 |

FOREIGN PATENTS

| | | |
|---|---|---|
| 1,250,769 | 12/1960 | France. |

WINSTON A. DOUGLAS, *Primary Examiner.*

JOHN R. SPECK, JOHN H. MACK, *Examiners.*

H. FEELEY, *Assistant Examiner.*